(12) United States Patent
Lewy et al.

(10) Patent No.: US 12,288,459 B1
(45) Date of Patent: Apr. 29, 2025

(54) SYSTEMS AND METHODS OF PROVIDING EMERGENCY NOTIFICATIONS TO OPERATIONS CENTERS USING RADIO-BASED DISPATCHES

(71) Applicant: RAPIDSOS, INC., New York, NY (US)

(72) Inventors: Leah Lewy, Jersey City, NJ (US); Conor Fucci, Brooklyn, NY (US); James Patrick Olejar, Jr., Fort Lauderdale, FL (US); Michael Heneka, Fabius, NY (US); Andrew Knitt, Oconomowoc, WI (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/006,548

(22) Filed: Dec. 31, 2024

(51) Int. Cl.
  *G08B 27/00* (2006.01)
  *G10L 15/26* (2006.01)
  *H04W 76/50* (2018.01)

(52) U.S. Cl.
  CPC .......... *G08B 27/001* (2013.01); *G10L 15/26* (2013.01); *H04W 76/50* (2018.02)

(58) Field of Classification Search
  CPC ....... G08B 27/001; H04W 76/50; G10L 15/26
  See application file for complete search history.

(56) References Cited

U.S. PATENT DOCUMENTS

| 2024/0022663 A1* | 1/2024 | Kolaxis | H04M 3/5116 |
| 2024/0406309 A1* | 12/2024 | Misiorny | G06F 40/35 |

* cited by examiner

*Primary Examiner* — Wayne H Cai
(74) *Attorney, Agent, or Firm* — William Pigott; Michael Ross

(57) ABSTRACT

An emergency response data system (ERDS) provides artificial intelligence (AI)-based emergency notifications to operations centers using radio-based dispatches from emergency communications center (ECC). The ERDS receives audio data of a radio-based dispatch of first responders to a location of an initiated emergency communication. The ERDS provides the audio data to an AI model with a prompt to transcribe the audio data into a radio dispatch transcript. The ERDS provides the radio dispatch transcript to the AI model with a prompt to analyze the radio dispatch transcript to extract a location of the initiated emergency communication from the radio dispatch transcript. The ERDS provides an AI-based emergency notification to an emergency response application that is operable to display the AI-based emergency notification on an operations center computing system. The AI-based emergency notification includes the location of the initiated emergency communication.

21 Claims, 14 Drawing Sheets

EXAMPLE AI PROMPT 400

```
YOU ARE AN INTELLIGENT AI ASSISTANT THAT PROCESSES EMERGENCY DISPATCH
RADIO TRANSCRIPTS TO EXTRACT ACCURATE LOCATION INFORMATION.

DO NOT PROVIDE EXPLANATORY TEXT OR DESCRIBE YOUR PROCESS. ONLY:
1. USE TOOLS AS NEEDED
2. RETURN THE FINAL JSON RESULT

CURRENT TRANSCRIPT: "{TRANSCRIPT}"
BIAS COORDINATES: {LAT}, {LON}

INITIAL PHONETIC MATCHES FOUND IN LOCAL STREETS:
{JSON.DUMPS(PHONETIC_MATCHES, INDENT=2)}

IMPORTANT: IF YOU IDENTIFY ANY ADDITIONAL STREET NAME MATCHES THAT
WEREN'T FOUND BY THE PHONETIC ALGORITHM ABOVE:
- INCLUDE THEM IN LOCATION_NOTES PREFIXED WITH "LLM-IDENTIFIED MATCH: "
- EXPLAIN YOUR REASONING FOR THE MATCH

REQUIRED ACTIONS:
1. MUST FIRST TRY EXACT TRANSCRIBED ADDRESS:
  SEARCH_LOCATION(ADDRESS="ADDRESS AS HEARD", CROSS_STREETS="IF
AVAILABLE", BIAS_LAT={LAT}, BIAS_LON={LON}, POI=NONE)

2. CONSIDER THE INITIAL PHONETIC MATCHES ABOVE:
  FOR EACH POTENTIAL MATCH:
   - EVALUATE IF IT MAKES SENSE IN CONTEXT
   - TRY SEARCHING WITH THE MATCHED STREET NAME
   - INCLUDE BOTH ORIGINAL AND MATCHED VERSIONS IN LOCATION NOTES

3. NOW CONSIDER ALL LOCAL STREET NAMES FOR ADDITIONAL MATCHES:
{JSON.DUMPS(STREET_NAMES, INDENT=2)}

FOR EACH WORD IN THE TRANSCRIBED STREET NAME:
   - COMPARE PHONETICALLY WITH EACH LOCAL STREET NAME FROM THE LIST
   - EXAMPLES OF PHONETIC MATCHES:
    * "CHESHAM" COULD MATCH: CHESTNUT, CHESTER, CHELSEA
    * "TOWN" COULD MATCH: TOWNE, TOWANDA
   - EXECUTE SEARCH_LOCATION FOR EACH POTENTIAL PHONETIC MATCH
   - PAY SPECIAL ATTENTION TO SIMILAR-SOUNDING WORD ENDINGS:
    * -YN/-INCE (LYNNE/LINCE)
    * -ER/-AR (CENTER/CEDAR)
    * -TON/-TOWN (BRIGHTON/DOWNTOWN)
```

FIG. 4A

EXAMPLE AI PROMPT 400

```
4. COMMON TRANSCRIPTION ERROR PATTERNS TO CHECK:
  - SINGLE-SYLLABLE WORDS THAT SOUND SIMILAR (ASH/NASH)
  - WORDS WITH SIMILAR CONSONANT SOUNDS (M/N, B/V, P/B)
  - WORDS THAT MAY BE CUT OFF OR PARTIALLY HEARD

5. LOCATION SELECTION PRIORITY:
  - WHEN A LOCAL STREET MATCH IS FOUND WITHIN 5 MILES OF THE BIAS LOCATION,
STRONGLY CONSIDER IT OVER THE EXACT TRANSCRIBED ADDRESS
  - IF MULTIPLE MATCHES EXIST, PREFER THE ONE CLOSEST TO THE BIAS LOCATION
  - ALWAYS INCLUDE ALTERNATE LOCATIONS IN THE RESPONSE FOR VERIFICATION

6. RETURN ONLY THIS JSON STRUCTURE WITH NO OTHER TEXT:
{{
  "TEXT": "{TRANSCRIPT}",
  "LOCATION": {{
    "LAT": FLOAT,
    "LON": FLOAT,
    "ADDRESS": "VALIDATED ADDRESS"
  }},
  "LOCATION_CONFIDENCE": "HIGH|MEDIUM|LOW",
  "LOCATION_NOTES": "INCLUDE ORIGINAL AND ANY LOCAL STREETS CHECKED",
  "ALTERNATE_LOCATIONS": [
    {{
      "LAT": FLOAT,
      "LON": FLOAT,
      "ADDRESS": "ALTERNATE ADDRESS",
      "FROM_VARIATION": "ORIGINAL|LOCAL STREET MATCH",
      "DISTANCE_FROM_BIAS": FLOAT
    }}
  ],
  "CORRECTIONS": [
    {{
      "ORIGINAL": "ORIGINAL TEXT",
      "CORRECTED": "CORRECTED TEXT",
      "TYPE": "LOCATION|GENERIC"
    }}
  ]
}}
```

FIG. 4B

EXAMPLE AI PROMPT 500

```
YOU ARE AN INTELLIGENT AI ASSISTANT THAT PROCESSES EMERGENCY DISPATCH
RADIO TRANSCRIPTS TO EXTRACT ACCURATE LOCATION INFORMATION.

DO NOT PROVIDE EXPLANATORY TEXT OR DESCRIBE YOUR PROCESS. ONLY:
1. USE TOOLS AS NEEDED
2. RETURN THE FINAL JSON RESULT

CURRENT TRANSCRIPT: "{TRANSCRIPT}"
BIAS COORDINATES: {LAT}, {LON}

REQUIRED ACTIONS:
1. MUST FIRST TRY EXACT TRANSCRIBED ADDRESS:
   SEARCH_LOCATION(ADDRESS="ADDRESS AS HEARD", CROSS_STREETS="IF
AVAILABLE", BIAS_LAT={LAT}, BIAS_LON={LON}, POI=NONE)

2. THEN USE SEARCH_STREETS TO FIND LOCAL STREET NAMES:
   SEARCH_STREETS(LAT={LAT}, LON={LON}, RADIUS=10000)

3. FOR EACH WORD IN THE TRANSCRIBED STREET NAME:
   - COMPARE PHONETICALLY WITH EACH LOCAL STREET NAME
   - EXAMPLES OF PHONETIC MATCHES:
     * "CHESHAM" COULD MATCH: CHESTNUT, CHESTER, CHELSEA
     * "TOWN" COULD MATCH: TOWNE, TOWANDA
   - EXECUTE SEARCH_LOCATION FOR EACH POTENTIAL PHONETIC MATCH
```

FIG. 5A

EXAMPLE AI PROMPT 500

```
4. RETURN ONLY THIS JSON STRUCTURE WITH NO OTHER TEXT:
{{
   "TEXT": "{TRANSCRIPT}",
   "LOCATION": {{
      "LAT": FLOAT,
      "LON": FLOAT,
      "ADDRESS": "VALIDATED ADDRESS"
   }},
   "LOCATION_CONFIDENCE": "HIGH|MEDIUM|LOW",
   "LOCATION_NOTES": "INCLUDE ORIGINAL AND ANY LOCAL STREETS CHECKED",
   "ALTERNATE_LOCATIONS": [
      {{
         "LAT": FLOAT,
         "LON": FLOAT,
         "ADDRESS": "ALTERNATE ADDRESS",
         "FROM_VARIATION": "ORIGINAL|LOCAL STREET MATCH",
         "DISTANCE_FROM_BIAS": FLOAT
      }}
   ],
   "CORRECTIONS": [
      {{
         "ORIGINAL": "ORIGINAL TEXT",
         "CORRECTED": "CORRECTED TEXT",
         "TYPE": "LOCATION|GENERIC"
      }}
   ]
}}
```

FIG. 5B

EXAMPLE AI PROMPT 600

> ROLE: YOU ARE AN INTELLIGENT AI ASSISTANT TASKED WITH PROCESSING EMERGENCY RADIO DISPATCH TRANSCRIPTS. THESE TRANSCRIPTS ARE DIRECTED TO FIRST RESPONDERS SUCH AS POLICE, FIRE, AND EMS UNITS, AND ARE GENERATED BY OPENAI'S WHISPER MODEL. DUE TO POTENTIAL TRANSCRIPTION ERRORS STEMMING FROM LOW AUDIO QUALITY OR DOMAIN-SPECIFIC JARGON, INCORRECT WORDS MAY SOUND PHONETICALLY SIMILAR TO THE CORRECT TERMS.
>
> OBJECTIVE: YOUR JOB INVOLVES THE FOLLOWING TASKS:
>
> 1. GEOCODING THE LOCATION:
> - IDENTIFY AND GEOCODE THE LOCATION OF THE INCIDENT FROM THE TRANSCRIPT, WHICH MAY BE A STREET ADDRESS OR AN INTERSECTION OF TWO ROADS. SOMETIMES A BUSINESS OR PLACE LOCATION MAY BE GIVEN.
> - IF A STREET ADDRESS IS PROVIDED, ENSURE IT INCLUDES BOTH A HOUSE NUMBER AND STREET NAME.
> - CROSS STREETS, IF MENTIONED, TYPILCALLY FOLLOW THE INCIDENT LOCATION AND CAN HELP IDENTIFY THE INCIDENT'S VICINITY. ONLY USE THEM IF THE STREET ADDRESS OR INTERSECTION LOCATION IS UNCLEAR.
> - IF SEARCH RESULTS ARE NOT YIELDING ACCURATE LOCATIONS, CONSIDER POTENTIAL TRANSCRIPTION ERRORS, ESPECIALLY IN LOCATION NAMES.
>
> 2. CORRECTING TRANSCRIPTION ERRORS:
> - GENERIC WORDS: ENSURE ACCURACY IN COMMON LANGUAGE.
> - LOCATION NAMES: UTILIZE THE 'SEARCH_MUNICIPALITIES' TOOL TO FIND NEARBY LOCATION NAMES AND CORRECT ANY ERRORS. USING A SEARCH RADIUS OF LESS THAN 1000 (METERS) WILL RETURN NEARBY STREET NAMES, WHILE USING A LARGER SEARCH RADIUS WILL PROVIE MORE NEARBY MUNICIPALITY NAMES.
> - AGENCY NAMES: MANY AGENCIES ARE NAMED AFTER THEIR LOCATIONS; USE THE 'SEARCH_MUNICIPALITIES' TOOL FOR VERIFICATION.
> - EMERGENCY DISPATCH JARGON: CORRECT JARGON ERRORS USING THE 'SEARCH_JARGON' TOOL AS YOUR EXCLUSIVE REFERENCE.
> - PHONETIC ALPHABET: RECOGNIZE THE USE OF NATO AND APCO/LAPD PHONETIC ALPHABETS.

FIG. 6A

EXAMPLE AI PROMPT 600

3. TRANSCRIPTION VERIFICATION:
 - CALL THE TRANSCRIBE_WHISPER_JAMES METHOD TO OBTAIN A MORE ACCURATE TRANSCRIPT. PROVIDE A TRANSCRIBE_WHISPER_JAMES WITH A PROMPT THAT INCLUDES LOCAL PLACE NAMES FROM SEARCH_MUNICIPALITIES TO HELP IMPROVE RESULTS. DON'T USE PRIOR TRANSCRIPTION RESULTS AS PART OF THE PROMPT.
 - BASED ON THE IMPROVED TRANSCRIPTION RESULTS, RE-RUN GEOCODING USING SEARCH_LOCATION
 - ONLY DO THIS A MAXIMUM OF ONE TIME.

GUIDELINES:
 - ONLY MAKE CORRECTIONS WHEN CONFIDENT, ENSURING BOTH PHONETIC SIMILARITY AND CONTEXTUAL RELEVANCE.
 - DISTINGUISH BETWEEN BREVITY CODES (E.G., 10-52) AND POTENTIAL ADDRESS NUMBERS USING CONTEXT.
 - UTILIZE LATITUDE AND LONGITUDE BIASES FOR SEARCH PRECISION.

INPUT DETAILS:
 - TRANSCRIPT: A COMPUTER-GENERATED TRANSCRIPT OF AN EMERGENCY RADIO DISPATCH.
 - BIAS LOCATION: LATITUDE AND LONGITUDE TO ENHANCE LOCATION SEARCH ACCURACY.
 - AUDIO FILE PATH: {AUDIO_FILE_PATH}

NOTE: RELIABLE PROCESSING OF THIS CRITICAL INFORMATION IS ESSENTIAL FOR FIRST RESPONDERS. HANDLE CORRECTIONS WITH UTMOST PRECISION AND CARE.

FIG. 6B

SYSTEMS AND METHODS OF PROVIDING EMERGENCY NOTIFICATIONS TO OPERATIONS CENTERS USING RADIO-BASED DISPATCHES

TECHNICAL FIELD

This disclosure relates generally to emergency management systems, and in particular to providing emergency notifications to global security operations centers (GSOCs) and other operations centers.

BACKGROUND

The moments immediately following an emergency can be critical in determining whether an injured person survives. Although operations centers oversee security and manage multiple buildings, storefronts, and other premises, they are often unaware of emergency incidents that result in 911 calls within the areas they oversee.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 4A and 4B illustrate example tables of AI prompt instructions that may be provided by one or more disclosed systems and/or processes to generate content for emergency notifications for operations centers, in accordance with embodiments of the disclosure.

FIGS. 5A and 5B illustrate example tables of AI prompt instructions that may be provided by one or more disclosed systems and/or processes to generate content for emergency notifications for operations centers, in accordance with embodiments of the disclosure.

FIGS. 6A and 6B illustrate example tables of AI prompt instructions that may be provided by one or more disclosed systems and/or processes to generate content for emergency notifications for operations centers, in accordance with embodiments of the disclosure.

DETAILED DESCRIPTION

Figure 1:
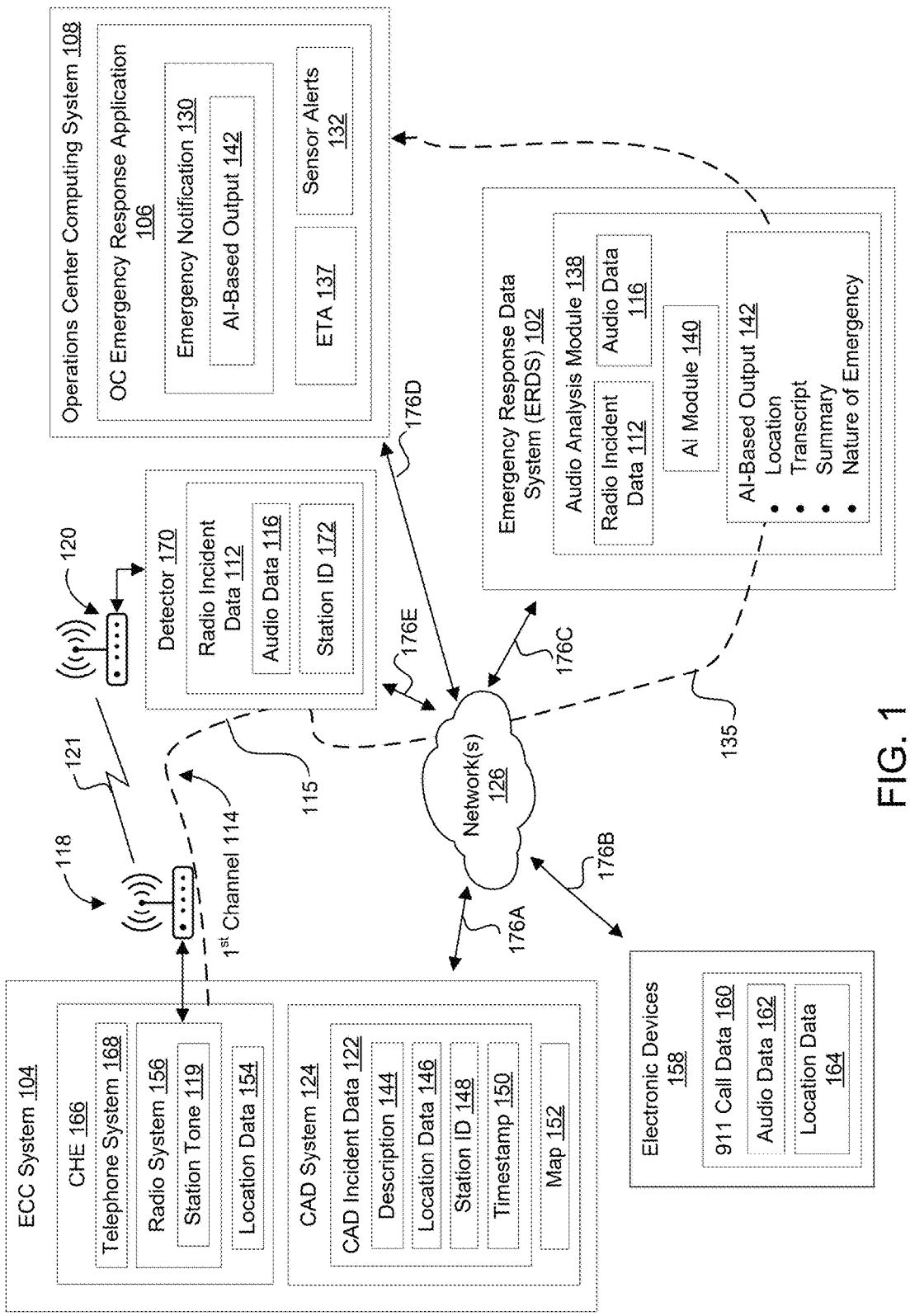
FIG. 1 illustrates an example system diagram of an emergency response environment that provides artificial intelligence (AI)-based emergency notifications to operations centers, in accordance with embodiments of the disclosure.

Various aspects of the disclosure include systems, devices, media, algorithms, and methods for providing emergency notifications to operations centers using radio-based dispatches. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A public emergency services agency may be established to provide a variety of services. A public emergency services agency can include a 911 call center, a railway call center, a primary call center, a secondary call center (e.g., that receives calls from or routes calls to a primary call center), and the like. A public emergency services agency may be referred to as an emergency service provider (ESP) or an emergency communications center (ECC). One type of ESP or ECC is a public safety answering point (PSAP). A PSAP is another name for a 911 call center that receives emergency calls and dispatches emergency responders in response to the emergency (e.g., 911) calls.

As used herein, a first responder may refer to a firefighter, an emergency medical technician, a paramedic, a police officer, a peace officer, an emergency medical dispatcher, a search and rescue team member, a hazardous materials (HazMat) responder, volunteer emergency workers, and/or public health officials. The systems, processes, and overall technologies disclosed herein may be applicable or implemented for one or more of the various types of first responders, despite some specific examples being directed to firefighters and/or medical service providers for illustrative purposes.

As used herein, an emergency response request may refer to an initiated emergency communication (e.g., a 911 call, a textual message to 911, etc.), a radio-based dispatch of first responders, and/or a CAD-based dispatch of first responders. A location of an initiated emergency communication may be at or near the location of the incident that is being reported through the initiated emergency communication. As used herein, the location of the initiated emergency communication may refer to the incident location that is described in the radio-based dispatch. The incident location is the location to which first responders are dispatched.

As used herein, operations centers refers to private operations centers that oversee, monitor, and/or manage security and emergency incidents across one or more related premises. Common types of operations centers (OC) that may, at least partially, coordinate response to security and emergency incidents include global security operations centers (GSOCs), railway network operations centers (NOCs), emergency operations centers (EOCs), cybersecurity operations centers (CSOCs), traffic operations centers (TOCs), energy or utility operations centers (UOCs), healthcare command centers, aviation operations centers, and maritime operations centers.

ECCs use radio-based transmissions to dispatch (e.g., request emergency services to a location) first responders. These radio-based dispatches are sent very shortly after 911 calls are made and represent near real-time information about an emergency (e.g., location, time, type of emergency, severity, etc.). This incredibly valuable information can be masked by low-quality audio, ambiguous addresses, and/or jargon that is specific to emergency response. To address these issues and provide operations centers with up-to-date information about relevant emergencies, embodiments of the disclosure include systems and methods for providing artificial intelligence (AI)-based emergency notifications to operations centers using the radio-based dispatches.

An emergency response data system (ERDS) performs a number of operations to generate AI-based emergency notifications, according to an embodiment. The ERDS may receive dispatch audio data file from a detector (e.g., a radio wave receiver or transceiver) that converts dispatches into audio data and saves the audio data into audio files. The ERDS may extract metadata, such as, the source ECC for the dispatch, the (intended) destination first responder station, a time stamp, a location of the detector that received the radio dispatch. The ERDS may condition the audio data by removing background noise, tones, and silences, for example. The ERDS may determine a geographical bias or bias region associated with (e.g., that includes) the source ECC or destination first responder station. The ERDS may use the bias region to query a mapping service for potential street names within the bias region. The ERDS may use an AI model (or transcription service) to transcribe the audio data. The AI model may be trained with historical dispatch data (e.g., transcripts or computer-aided dispatch data). The transcript may be searched for names that may be part of an address or emergency location. One or more phonetical function or analyses may be applied to the potential street names and/or searched names. Phonetical analysis may include encodings (Soundex, Metaphone, NYSIIS) and similarity metrics (e.g., Levenshtein distance, Jaro-Winker, phonetic code comparison, etc.). Phonetical matches between the potential street names may be provided to an AI model as potential addresses to facilitate accurate location extraction.

The ERDS may apply the transcript of the radio dispatch to an AI model to generate various types of AI-based output. The AI-based output may include a location of the emergency, a transcript of the dispatch, a type of the emergency, and/or a summary of the dispatch. The ERDS may provide the bias region, the potential street names, the searched names, and/or the phonetical matches as context for prompt instructions "prompts" provided to the AI model. One or more detailed prompts may be provided to the AI model to generate content (e.g., AI-based output) for the AI-based emergency notifications.

The AI-based output may be provided to an operations center emergency response application as part of an (AI-based) emergency notification. The emergency response application may display the location of the emergency as text, as point on a map, and/or by highlighting a premises (e.g., building, structure, etc.). The ERDS may host the emergency response application and push updates to a remote instance of the application via an Internet-based connection with the instance.

Overall, embodiments of the disclosure improve the technology area of 911 service systems and emergency response systems by improving expanding the recipient pool of emergency notifications to include operations centers. Coordinating with ECCs and first responders, early notification of, for example, on-premises 911 calls may enable operations centers to reduce property damage, save lives, and reduce injuries to first responders arriving to the scene of an emergency. Various embodiments of the disclosure are described hereafter and represented in FIGS. 1-10.

FIG. 1 illustrates an example system diagram of an emergency notification environment 100 that provides artificial intelligence (AI)-based emergency notifications to operations centers using radio-based dispatches, in accordance with aspects of the disclosure. Emergency notification environment 100 includes an emergency response data system (ERDS) 102 that is operable to receive emergency response requests (e.g., a dispatch) over one or more channels from an ECC system 104 and is operable to provide an AI-based analysis of radio-based requests/dispatches to generate and provide notification of an emergency at one or more premises managed by an operations center, in accordance with aspects of the disclosure. One channel may be at least partially based on an over-the-air radio transmission (e.g., in the VHF or UHF bands) from a dispatcher, and another of channel may at least partially be from a computer-aided dispatch (CAD) system 124. Because operations centers (e.g., a GSOC, train NOC, etc.) may be unaware of emergency calls (e.g., calls to 911), operations centers may be unable to provide resources (e.g., onsite security, onsite medical, etc.) to the location of an emergency call. Additionally, first responders may need access to buildings, gates, or other access points that could be opened prior to the arrival of the first responders, had an operations center known of the time, place, and/or nature of emergency calls made from the premises managed by the operations center. Various embodiments of the disclosure enable AI-based emergency notifications using radio-based dispatches that can be monitored over-the-air and analyzed.

ERDS 102 receives and analyzes emergency response requests (e.g., radio-based dispatches) to support generating an emergency notification 130 for operations center computing system 108, in accordance with aspects of the disclosure. ERDS 102 is configured to receive radio incident data 112 over a first channel 114. First channel 114 may have a path 115 that extends from ECC system 104 to detector 170, to ERDS 102, and to operations center computing system 108. First channel 114 at least partially includes radio transmission of audio data 116 from a radio 118 to a radio 120. Radio 118 may be a UHF and/or VHF radio transceiver that is operated by a dispatcher or telecommunicator at an ECC. Radio 120 may be a radio receiver or scanner that is configured to receive audio transmissions from radio 118 over one or more frequencies. Radio incident data 112 includes an over-the-air emergency response request that may initially be an audio recording of a dispatched incident (e.g., represented as audio data 116). Radio incident data 112 may also include a time stamp and a station ID 117 that identifies the one or more dispatched stations (e.g., fire station, emergency medical services, etc.). The station ID 117 may be determined based on a station tone 119 used during the radio communications that provide the emergency response request. ERDS 102 may analyze/compare radio incident data 112 and CAD incident data 122 to determine if one source of incident data is duplicative of the other and/or to perform error correction. ERDS 102 analyzes content of audio data 116 and provides AI-based output 142 to operations center (OC) emergency response application 106, in accordance with aspects of the disclosure.

ERDS 102 may include an audio analysis module 138 to provide emergency notification 130 to OC emergency response application 106, according to an embodiment. Audio analysis module 138 may generate emergency notification 130 based on audio processing, transcribing, AI analyzing, and/or formatting audio data 116, according to an embodiment. Audio analysis module 138 may generate emergency notification 130 without transcribing audio data 116 and instead may apply audio data 116 directly to one or more AI models (e.g., AI module 140) to generate at least parts of emergency notification 130. Audio analysis module 138 may be configured to extract audio data 116 from radio incident data 112 and apply audio data 116 to an AI module 140 to generate AI-based output 142, according to an embodiment. AI module 140 may include one or more of: a transcription tool, a transcription service, a large language model (LLM), one or more machine learning algorithms, and/or an artificial intelligence (AI) model, in accordance with various aspects of the disclosure. Audio analysis module 138 may provide audio data 116 and one or more prompts to AI module 140 (e.g., one or more AI models) to generate AI-based output 142, according to an embodiment.

AI module 140 may be implemented using one or more of a variety of technologies. AI module 140 may be a service that emergency response data system 102 communicates with remotely or may include a number of libraries and software packages installed onto one or more local or distributed server (e.g., cloud) systems. AI module 140 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pre-trained transformer): a generative model for text-based tasks; and ResNet: a pre-trained deep learning model commonly used for image classification. AI module 140 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

AI module 140 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pre-trained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok.

ERDS 102 is configured to receive CAD incident data 122 from a CAD system 124 over one or more networks 126, according to an embodiment. CAD incident data 122 includes, but is not limited to, a description 144, location data 146, a station ID 148, and a timestamp 150, according to embodiments of the disclosure. Location data 146 and/or other CAD incident data 122 may be displayed or otherwise represented on a map 152 of CAD system 124.

ERDS 102 may be configured to receive CAD incident data 122 over a second channel 134. The second channel 134 is a CAD-based transmission/reception of an emergency request response, according to an embodiment. ERDS 102 may support a number of application programming interfaces (APIs) that enable CAD system 124 to transmit/receive incident data for emergency response requests. The second channel 134 includes a data path 135 that extends from CAD system 124, extends to ERDS 102 through one or more networks 126, and extends to emergency response application 106, according to an embodiment. CAD incident data 122 includes an emergency response request (e.g., inclusive of description 144, location data 146, and/or station ID 148) that may initially become available from CAD system 124 and be dispatched electronically to, for example, ERDS 102. ERDS 102 may evaluate radio incident data 112 and CAD incident data 122 and selectively train one or more AI models for accuracy improvement.

Emergency response requests may be initiated with electronic devices, according to an embodiment. Electronic devices 158 represent smart phones, smart watches, tablets, laptops, computer systems, or the like. Electronic devices 158 may initiate an emergency response request with various types of emergency communication, such as a 911 call, a textual message to 911, a panic button, or the like. Electronic devices 158 may then provide 911 call data 160 to ECC system 104 using one or more cellular networks or other networks 126. The 911 call data 160 may include audio data 162 and location data 164. The audio data 162 is representative of the information a caller audibly (or text-based) provides to ECC system 104 during, for example, a conversation with a telecommunicator, in one embodiment. The location data 164 may represent device-based location data (e.g., GPS, other satellite network, wireless router location, etc.) or may represent automated location information (ALI) data that is at least partially generated/provided by a cellular tower as an estimated location of an electronic device.

ECC system 104 provides tools for call-takers, dispatchers, or other telecommunicators to interact with emergency number callers (e.g., users of electronic devices 158). ECC system 104 may include call handling equipment (CHE) 166 and CAD system 124 to support delivery of emergency response requests to first responder devices and/or to operations center computing system 108. CHE 166 may include a telephone system 168 and radio system 156 (inclusive of radio 118) for receiving 911 call data 160 and for communicating radio incident data 112, according to an embodiment. Telephone system 168 may include one or more landlines and one or more voice over IP (VoIP) lines. A telecommunicator may use radio system 156 to broadcast an over-the-air emergency response request to one or more emergency responders 110. As part of dispatching an over-the-air emergency response request, radio system 156 may emit a station tone 119 and audio data 116 with radio 118 over ultra-high frequency (UHF) and/or very-high frequency (VHF) bandwidths. Station tones can be associated with one or more particular stations or types of emergency responders 110 (e.g., firefighter, emergency medical services, police officers, etc.). For example, within a county a first fire station may be assigned or associated with a first tone sequence, a second fire station may be assigned or associated with a second tone sequence, and all fire stations within the county may be assigned/associated with a third tone sequence. In the same county, a first emergency medical service (e.g., emergency medical technicians (EMTs)) station may be assigned a fourth tone, a second emergency medical service station may be assigned a fifth tone sequence, and the first fire station and the second emergency service station may be assigned a sixth tone sequence, for example. In some counties, a fire station may also serve as an emergency medical service station, so the station may be associated with a single tone sequence or three separate tone sequences, for example.

CAD system 124 may be used in parallel with CHE 166 by telecommunicators to provide emergency response requests to emergency responders 110. CAD system 124 may automatically receive at least part of CAD incident data 122 (e.g., location data 146) from EMS 102 or other emergency data providers, according to one embodiment. CAD system 124 may also receive CAD incident data 122 by a dispatcher or telecommunicator that enters the content of audio data 162 into CAD system 124. CAD incident data 122 includes description 144, location data 146, station ID 148, and timestamp 150. Description 144 may include the type of incident, people involved in the incident, a description of injuries, and the like. Location data 146 may include an address, descriptive location, and/or latitude/longitude coordinates to an incident. The term "address" may be used interchangeably with "descriptive location". An address or descriptive location may include a street address, a general location, and/or a street address combined with a description or address modifier, such as: in front of 123 Main Street, across the street from 234 Second Street, southwest of the residence on 345 Third Street, on the north end of Bay View Park, etc. Station ID 148 may include an identifier of one or more fire stations or emergency medical services stations that are near the location of an incident or that have jurisdictional responsibility for the location of the incident. The timestamp 150 may provide a date and time for when a call was made to 911 or may refer to when CAD incident data 122 was entered into CAD system 124.

Emergency notification environment 100 may include detector 170 that is operable to digitally capture (analog audio) information provided by radio 118 and received by radio 120, according to an embodiment. Detector 170 may be communicatively coupled to radio 120, and radio 120 may be strategically located where radio waves 121 may be detected from radio 118 (e.g., away from a station or home of an emergency responder). Detector 170 may be configured to generate radio incident data 112 based on the information provided with radio system 156. Radio incident data 112 may include audio data 116 and station ID 172. Audio data 116 may be a recording (in a digital format) of an emergency response request that was transmitted/dispatched using radio 118. Station ID 172 may be determined by detector 170 based on the station tone 119 transmitted by radio system 156/radio 118. In one embodiment, radio 120 and detector 170 are aspects of ERDS 102, according to an embodiment.

Emergency response application 106 enables operations center operators to receive emergency notification 130 of on-premises or onsite initiated emergency communications, according to an embodiment. Emergency notification 130 may include an address of an emergency, a graphical representation of the location of the emergency, an AI-based summary of the emergency, a transcript of the dispatch, and/or the nature of the emergency. Emergency notification 130 may include or be displayed with AI-based output 142, an estimated time of arrival (ETA) 137, and/or one or more sensor alerts 132. A user interface of the emergency response application may include one or more maps or floorplans, and the location of the dispatched emergency may be displayed on the maps and/or floorplans. Sensor data 132 is representative of one or more smart sensors associated with the managed premises, telematics data from nearby vehicles, medical data from people near the managed premises, weather data, traffic data, and/or other data sources that ERDS 102 may receive and aggregate to provide further context of an initiated emergency communication, according to an embodiment.

Networks 126 may be communicatively coupled to various components of emergency notification environment 100 using a number of communications channels 176. For example, a communications channel 176A may communicatively couple ECC system 104 to the one or more networks 126. A communications channel 176B may communicatively couple electronic devices 158 to the one or more networks 126. A communications channel 176C may communicatively couple ERDS 102 to the one or more networks 126. A communications channel 176D may communicatively couple operations center computing system 108 to the one or more networks 126. A communications channel 176E may communicatively couple detector 170 to the one or more networks 126, for example. Communications channels 176A, 176B, 176C, 176D, and 176E may be collectively referred to as communications channels 176, which may enable the various components of emergency notification environment 100 to communicate with each other.

Figure 2:
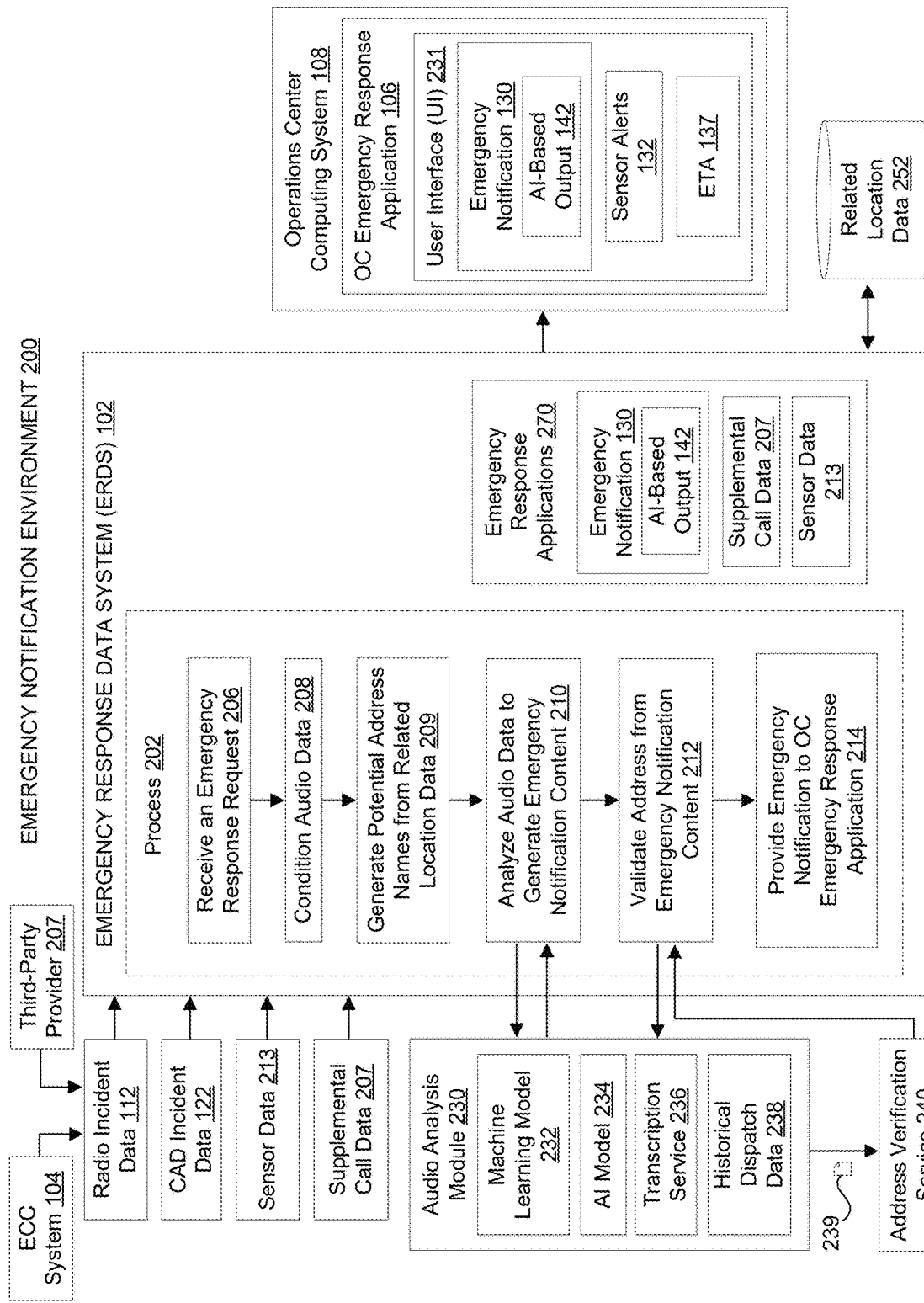
FIG. 2 illustrates an example diagram of an emergency notification environment that is operable to provide an emergency notification using one or more AI models to analyze radio dispatched emergency response requests received from an ECC, in accordance with aspects of the disclosure.

FIG. 2 illustrates an example diagram of an emergency notification environment 200 that is operable to provide an emergency notification using one or more AI models to analyze radio dispatched emergency response requests received from an ECC, in accordance with aspects of the disclosure. Emergency notification environment 200 is an example implementation of emergency notification environment 100, according to embodiments. Emergency notification environment 200 may run a process 202 in/with ERDS 102. ERDS 102 may be organized as one or more software modules including one or more processes, such as process 202 and/or other processes disclosed herein. Process 202 and/or ERDS 102 transform input data (e.g., radio incident data 112, CAD incident data 122, sensor data 213, and/or supplemental call data 207) into emergency notification 130 and/or AI-based output 142, in accordance with various aspects of the disclosure.

Process 202 may include a number of operations for generating AI-based output 142 for emergency notification 130 using radio-based dispatches, in accordance with aspects of the disclosure. The order in which some or all of the process operation blocks appear in process 202 should not be deemed limiting. Rather, one of ordinary skill in the art having the benefit of the present disclosure will understand that some of the process blocks may be executed in a variety of orders not illustrated, or even in parallel. The operations of process 202 may be performed by a particular system (e.g., emergency responder notification system 204) or may be distributed between various subsystems or modules in ERDS 102 and/or in emergency notification environment 200, according to various embodiments.

At operation 206, process 202 receives an emergency response request, according to an embodiment. The emergency response request may be represented by radio incident data 112, which includes audio data for a radio-based dispatch from an ECC about an initiated emergency communication. Radio incident data 112 may represent a radio-based dispatch from ECC system 104 about an initiated emergency communication (e.g., 911 call, textual message to 911), in one embodiment. Radio incident data 112 may be received from a third-party provider 207 that detects and records various radio-based dispatches across the country and/or world. ERDS 102 may process audio data from various radio-based dispatches to determine the nature of the emergency, to generate a summary of the dispatch, to determine a location of the initiated emergency communication, and/or to generate transcripts of the dispatches, in accordance with aspects of the disclosure. Radio incident data 112 may include incident data that was at least partially recorded with a detector that is coupled to a scanner to receive a radio-based dispatch from an ECC. Operation 206 may proceed to operation 208.

At operation 208, process 202 conditions audio data from the emergency response request (e.g., radio incident data 112), according to an embodiment. Audio data may include/represent recording of a dispatch of an incident that is captured by the detector and provided to ERDS 102. Conditioning the audio data may include, but is not limited to, metadata retrieval from the audio file (e.g., time stamp, duration, detector ID, station ID, etc.), audio cleaning, and/or determining a bias region (e.g., location of emergency agency that sent a dispatch or that is the intended recipient of the dispatch).

Audio cleaning may include operations on the audio data to enhance the audio data quality for transcription. One or more software functions may be used to remove background noise, tones, and silences. Parameters similar to a silence_thresh (e.g., the minimum volume threshold to identify non-silence) and min_silence_len (e.g., the minimum duration to consider a segment as silence) may be configured to further improve the cleaning process. The cleaned audio may be subsequently saved as a new file, ready transcription and/or further processing.

Determining a bias region may be performed with one or more functions that operate on metadata of the audio data file and/or radio incident data 112. In one embodiment, a bias region is determined based on analysis of content of the audio data. The bias region generally refers to a location of an emergency agent (e.g., an ECC or a first responder station that is the intended recipient of a dispatch). The bias region may be defined as a predetermine radius (e.g., 10 km) around the emergency agent, according to one embodiment. The center of the bias region may be defined by the latitude (e.g., bias_lat) and longitude (e.g., bias_lon) of the bias point. This phase ensures the audio data is prepared, cleaned, and enriched with metadata for accurate transcription and subsequent processing. Operation 208 may proceed to operation 209.

At operation 209, process 202 generates potential address names from related location data (e.g., the bias region), according to an embodiment. Process 202 may provide the bias region to a mapping service, such as OpenStreetMap, Apple Maps, etc., to retrieve the street names within and/or proximate to the bias region. The bias region may be provided to the mapping service using application programming interface (API) calls/functions, and the (list of) street names may be retrieved from the mapping service using API. These potential address/street names may be stored in a database such as related location data 252 and/or may be provided to an AI model to increase the likelihood accurate location determination. Operation 209 may proceed to operation 210.

At operation 210, process 202 analyzes audio data to generate emergency notification content, according to an embodiment. Process 202 may provide the audio data to audio analysis module 230 to analyze the audio data. One or more AI models and/or transcription services may be used to directly analyze the audio data or to initially generate a transcript of the audio data. One or more transcription engines or services (e.g., Dragon Naturally Speaking, Otter.ai, Rev.com, Trint, etc.) that may or may not leverage an artificial intelligence (AI) model may be used to transcribe the audio, in accordance with various implementations of the disclosure. Emergency notification content may include, but is not limited to, a summary of the audio data, a transcript of the audio data, a nature/type of emergency dispatched, and/or an address/location of the initiated emergency communication that cause the radio-based dispatch.

Process 202 may include various types of prompts to one or more AI models to generate emergency notification content. The AI model output may be referred to herein as AI-based output. Prompts to the AI model and/or to other (e.g., Python) software functions may include, but are not limited to, phonetic analysis using encodings such as: Soundex—handles similar-sounding consonants; metaphone—focuses on English pronunciation patterns; and NYSIIS—accounts for common spelling variations. These encodings may then be analyzed against the transcribed street names using similarity metrics, including: Direct Substring Matching—checks if one string is contained within another; Levenshtein Distance—measures the minimum number of single-character edits required to change one word into another; Jaro-Winkler Similarity—produces a score between 0 and 1, where 1 indicates an exact match; and/or Phonetic Code Comparison—compares the phonetic encodings of both strings. This phonetic analysis may be performed on radio dispatch transcripts by non-AI software and/or may be performed (e.g., using instructive prompts) by one or more AI models. Operation 210 may proceed to operation 212.

At operation 212, process 202 validates an address or location from the emergency notification content, according to an embodiment. To validate the address from the emergency notification content, operation 212 includes applying the content to an audio analysis module 230 and/or to an address verification service 240, according to an embodiment. Audio analysis module 230 is an example implementation of audio analysis module 138 (shown in FIG. 1). Audio analysis module 230 may be used to determine or verify an address from transcribed audio data (e.g., from operation 210) or from audio data. Audio analysis module 230 may include a machine learning model 232, an AI model 234, and/or a transcription service 236—each of which may be trained on historical dispatch data 338 and/or on CAD incident data 122, according to an embodiment. In some implementations, transcription service 236 may include a machine learning model 232 and/or AI model 234. Transcription service 236 may include commercially available solutions, such as Dragon NaturallySpeaking®, Otter.ai, Sonicx.ai, Descript, Verbit, and/or Google® services. For example, Google Cloud Natural Language service or Google Cloud Speech-to-Text service may enable training of sentiment classification, extraction, and detection by uploading training data, for example. Audio analysis module 230 may be prompted or configured to extract an address from the content that has been transcribed from the audio data.

Example prompts may include "determine an address from this text," for example. Audio analysis module 230 may provide a proposed address 239 to address verification service 240 (e.g., OpenStreetMap®, Google Maps™, Apple Maps™, etc.) for validation. Address verification service 240 may include one or more commercially available address verification services, such as, but not limited to, Google® address verification, Apple Maps™, ETSi maps, or the like.

Those skilled in the art understand that machine learning comprises a branch of artificial intelligence. Machine learning typically employs learning algorithms such as Bayesian networks, decision trees, nearest-neighbor approaches, and so forth, and the process may operate in a supervised or unsupervised manner as desired. Deep learning (also sometimes referred to as hierarchical learning, deep neural learning, or deep structured learning) is a subset of machine learning that employs networks capable of learning (typically supervised, in which the data consists of pairs (such as input data and labels) and the aim is to learn a mapping between the input data and the associated labels) from data that may at least initially be unstructured and/or unlabeled. Deep learning architectures include deep neural networks, deep belief networks, recurrent neural networks, and convolutional neural networks. Many machine learning algorithms (e.g., AI algorithms) build a so-called "model" (e.g., an AI model) based on sample data, known as training data or a training corpus, in order to make predictions or decisions without being explicitly programmed to do so. A variety of different methodologies and models may be employed with these teachings, such as those disclosed herein.

AI model 234 may be implemented using one or more of a variety of technologies. AI model 234 may be a service that emergency response data system 102 communicates with remotely or may include a number of libraries and software packages installed onto one or more local or distributed server (e.g., cloud) systems. AI model 234 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pre-trained transformer): a generative model for text-based tasks; and ResNet: a pre-trained deep learning model commonly used for image classification. AI model 234 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

AI model 234 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pre-trained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok.

In one implementation, audio analysis module 230 iteratively identifies and proposes a potential address from the transcribed audio data at least partially on the related location data (e.g., street names from a mapping service). Audio analysis module 230 may search for key terms such as location, located at, at, and/or address. Audio analysis module 230 may then define 3-5 words that follow (or precede) the key term or that precede the key term to be a potential address or location. Although the term "address" is used to reference the location of an emergency, address may also include relative descriptors such as, "across the street from", "half a mile north of", "the south-west corner of", "behind the building located at", or the like. Audio analysis module 230 may provide the potential or proposed address 239 to address verification service 240. Of the one or more proposed addresses, audio analysis module 230 may select or return the verified or valid address as the address associated with the transcribed audio data, according to an embodiment. Operation 212 may proceed to operation 214.

At operation 214, process 202 provides an emergency notification to operations center emergency response application 106 to provide or increase visibility at operations centers for emergencies occurring on premises or areas that the operations centers oversee, according to an embodiment. The emergency notification includes AI-based output 142 having one or more of a location of the emergency, a transcript of the radio-based dispatch, a summary of the radio-based dispatch, and/or a nature/type of emergency that are at least partially generated by providing prompts and data and context to one or more AI models. Emergency notification 130, sensor alerts 132, and/or ETA 137 may be displayed by a user interface (UI) 231 of emergency response application 106, according to an embodiment.

One or more of the operations of process 202 may use CAD incident data 122, sensor data 213, and/or supplemental call data 207 to train, supplement, and/or otherwise improve information provided in emergency notification 130, according to various embodiments of the disclosure. CAD incident data 122 may include text-based data for a dispatch that may be concurrently transmitted over-the-air as a radio-based dispatch. CAD incident data 122 may include a type of emergency, a location of the emergency, and a summary of the emergency. ERDS 102 may be configured to compare and contrast AI-generated output (e.g., a type of emergency, a location of the emergency, and a summary of the emergency) with CAD incident data 122 (e.g., a type of emergency, a location of the emergency, and a summary of the emergency) as accuracy feedback for improving the accuracy of the AI model, when CAD incident data 122 is available. Sensor data 213 may be retrieved or received by ERDS 102 an may include, but is not limited to, fire alarm data, smoke sensor data, temperature sensor data, proximity sensor data, moisture sensor data, pressure sensor data, shock sensor data, image sensor data, telematics data, door/window sensor data, and/or ambient conditions data, for example. Supplemental call data 207 may refer to hybrid device-based location data that may be received from telecommunications companies/device manufacturers. For example, a smartphone manufacturer may configure smartphones to temporarily turn on location-based sensors and provide the telephone number, a time stamp, and/or the device location to ERDS 102 when an emergency communication (e.g., call or text to 911) is initiated from the device, according to an embodiment.

ERDS 102 hosts emergency response applications 270 to support delivery of data and experiences to operations centers, ECCs, and/or first responders, in accordance with aspects of the disclosure. Emergency response applications 270 may support Internet-based connections between ERDS 102 and operations centers, ECCs, and/or first responders computing systems. ERDS 102 may provide emergency notification 130, AI-based output 142, and various types of data to emergency response applications 270, which are then pushed to local instances of the application (e.g., emergency response application 106), for example.

Figure 3:
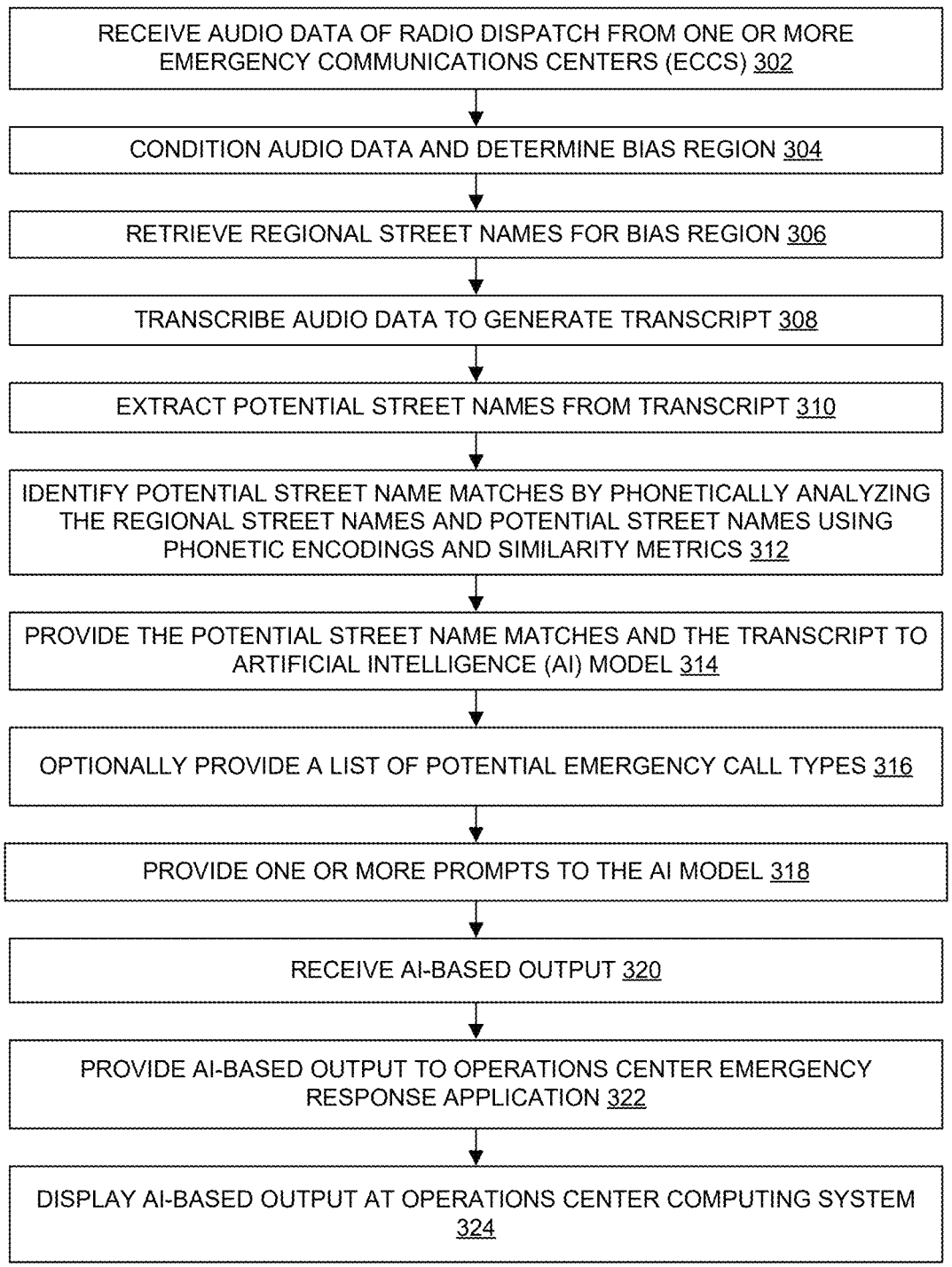
FIG. 3 illustrates an example diagram of a process for providing AI-based emergency notifications to operations centers using radio-based dispatches, in accordance with embodiments of the disclosure.

FIG. 3 illustrates a diagram of a process 300 for providing AI-based emergency notifications to operations centers using radio-based dispatches, in accordance with aspects of the disclosure. The order in which some or all of the process operation blocks appear in process 300 should not be deemed limiting. Rather, one of ordinary skill in the art having the benefit of the present disclosure will understand that some of the process blocks may be executed in a variety of orders not illustrated, or even in parallel. The operations of process 300 may be performed by a particular system (e.g., ERDS 102) or may be distributed between various subsystems or modules in an ERDS, according to various embodiments.

At operation 302, process 300 receives audio data of radio dispatch from one or more emergency communications centers (ECCs), according to an embodiment.

At operation 304, process 300 conditions audio data and determines bias region, according to an embodiment. The bias region may be based on the location of an emergency agency that sent or was the intended recipient of a radio-based dispatch.

At operation 306, process 300 retrieves regional street names for bias region, according to an embodiment. Regional street names may be retrieved by providing: the location of the emergency agency and a predetermined radius around the location of the emergency agency to a mapping service, according to an embodiment.

At operation 308, process 300 transcribes the audio data to generate a transcript, according to an embodiment.

At operation 310, process 300 extract potential street names from the transcript, according to an embodiment.

At operation 312, process 300 identifies potential street name matches by phonetically analyzing the regional street names and potential street names using phonetic encodings and similarity metrics, according to an embodiment.

At operation 314, process 300 provides the potential street name matches and the transcript to an artificial intelligence (AI) model, according to embodiments.

At operation 316, process 300 optionally provide a list of potential emergency call types, according to an embodiment.

At operation 318, process 300 provides one or more prompts to the AI model, according to an embodiment.

At operation 320, process 300 receives the AI-based output, according to an embodiment.

At operation 322, process 300 provides AI-based output to an operations center emergency response application, according to an embodiment.

At operation 324, process 300 displays AI-based output at operations center computing system, according to an embodiment.

FIGS. 4A, 4B, 5A, 5B, 6A, and 6B illustrate example tables of AI prompt instructions "prompts" that may be provided by one or more disclosed systems and/or processes to generate content for emergency notifications for operations centers, in accordance with aspects of the disclosure. Example AI prompts 400, 500, and 600 generally include a role of the AI model, key: value pair definitions for formatted input, instructions for receiving context data, required actions, actions to consider, phonetical instructions, phonetical variations, suggested patterns to check, priority considerations, and/or output formatting instructions, in accordance with embodiments of the disclosure.

Figure 7A:
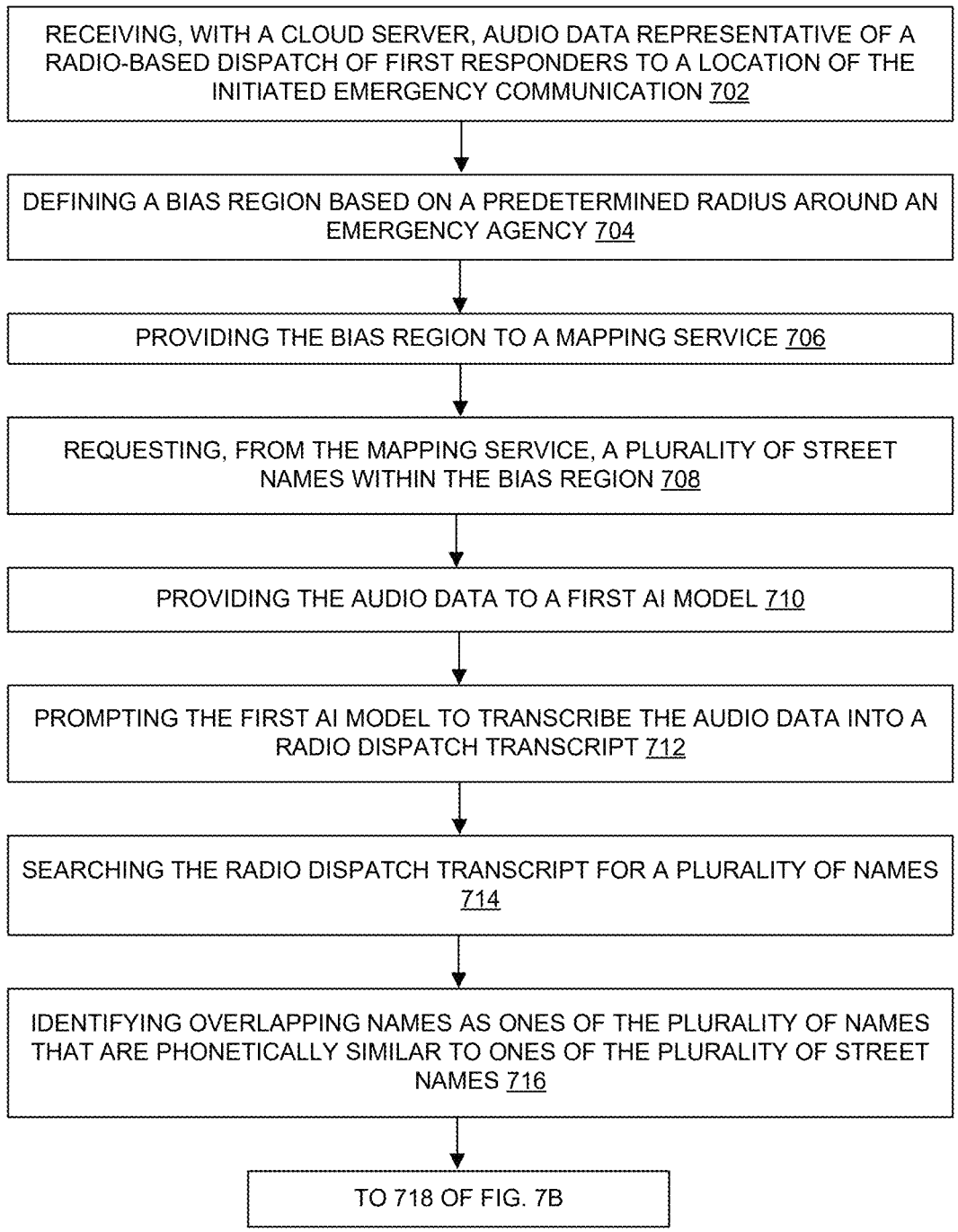
FIGS. 7A and 7B illustrate a diagram of a process for generating AI-based emergency notification for operations centers from radio-based dispatches, in accordance with embodiments of the disclosure.
Figure 7B:
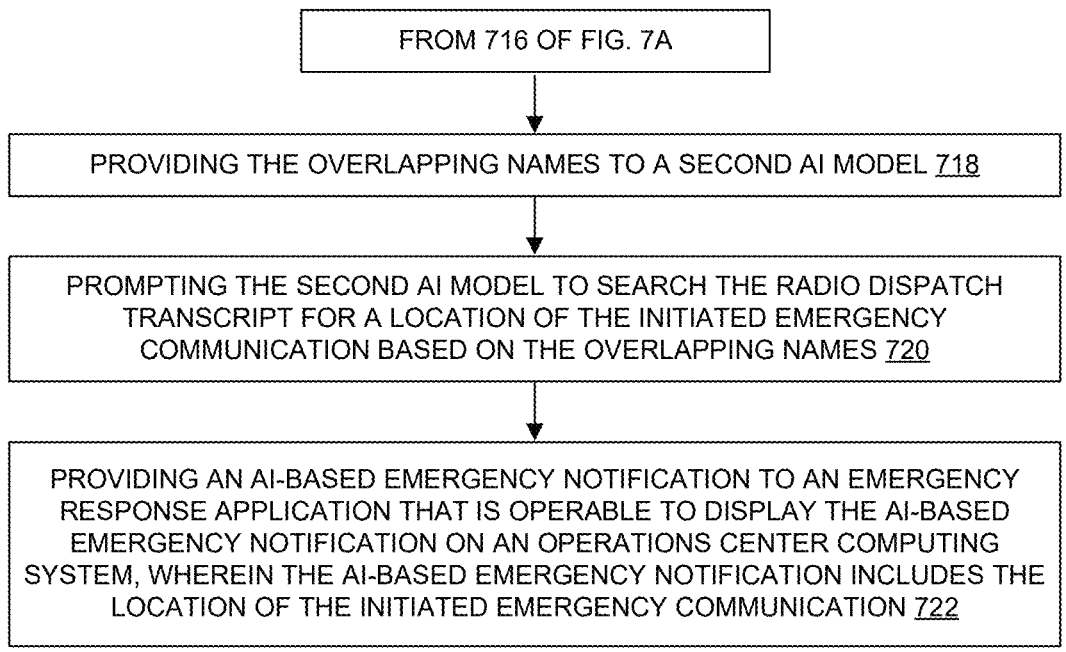

FIGS. 7A and 7B illustrate a diagram of a process 700 for generating AI-based emergency notification for operations centers from radio-based dispatches, in accordance with aspects of the disclosure. The order in which some or all of the process operation blocks appear in process 700 should not be deemed limiting. Rather, one of ordinary skill in the art having the benefit of the present disclosure will understand that some of the process blocks may be executed in a variety of orders not illustrated, or even in parallel. The operations of process 700 may be performed by a particular system (e.g., ERDS 102) or may be distributed between various subsystems or modules in an ERDS, according to various embodiments.

At operation 702, process 700 receives, with a cloud server, audio data representative of a radio-based dispatch of first responders to a location of the initiated emergency communication, according to an embodiment. A location of an initiated emergency communication may be at or near the location of the incident that is being reported through the initiated emergency communication (e.g., 911 call, textual message to 911, etc.). The location of the initiated emergency communication is the incident location that is described in the radio-based dispatch, in accordance with aspects of the disclosure. The incident location is the location to which first responders are dispatched and oftentimes overlaps with the location of the 911 caller/message sender.

At operation 704, process 700 defines a bias region based on a predetermined radius around an emergency agency, according to an embodiment. The bias region may be based on the location of an emergency agency that sent or was the intended recipient of a radio-based dispatch.

At operation 706, process 700 provides the bias region to a mapping service, according to an embodiment. The bias region may be latitude and longitude coordinates of an emergency agency and a radius (e.g., 10 km) around the coordinates.

At operation 708, process 700 requests, from the mapping service, a plurality of street names within the bias region, according to an embodiment.

At operation 710, process 700 provides the audio data to a first AI model, according to an embodiment.

At operation 712, process 700 prompts the first AI model to transcribe the audio data into a radio dispatch transcript, according to an embodiment.

At operation 714, process 700 searches the radio dispatch transcript for a plurality of names, according to embodiments.

At operation 716, process 700 identifies overlapping names as ones of the plurality of names that are phonetically similar to ones of the plurality of street names, according to an embodiment.

At operation 718, process 700 provides the overlapping names to a second AI model, according to an embodiment.

At operation 720, process 700 prompts the second AI model to search the radio dispatch transcript for a location of the initiated emergency communication based on the overlapping names, according to an embodiment.

At operation 722, process 700 provides an AI-based emergency notification to an emergency response application that is operable to display the AI-based emergency notification on an operations center computing system, wherein the AI-based emergency notification includes the location of the initiated emergency communication, according to an embodiment.

Figure 8:
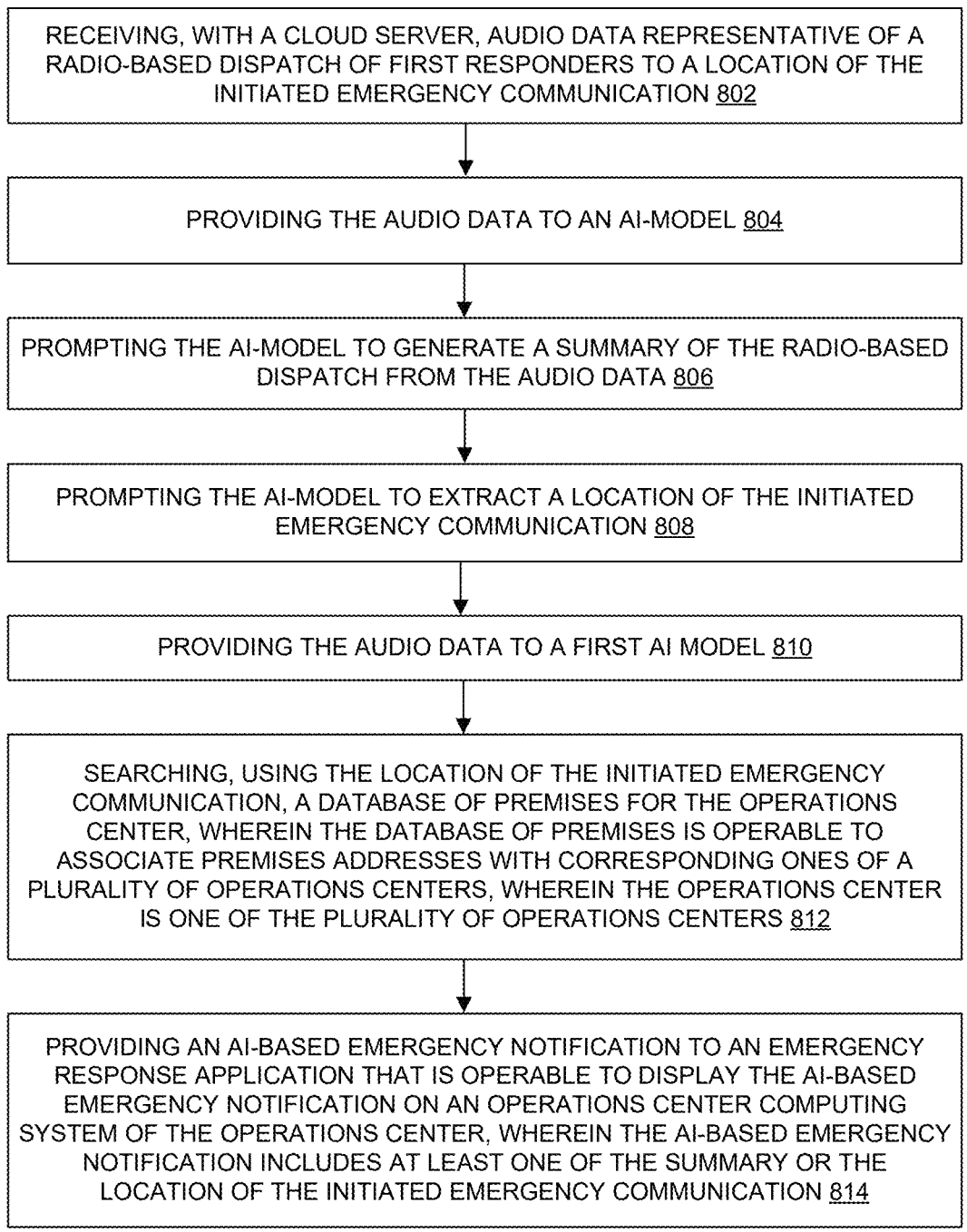
FIG. 8 illustrates a diagram of a process for notifying an operations center of an initiated emergency communication proximate to one of a plurality of premises associated with the operations center, in accordance with embodiments of the disclosure.

FIG. 8 illustrates a diagram of a process 800 for notifying an operations center of an initiated emergency communication proximate to one of a plurality of premises associated with the operations center, in accordance with aspects of the disclosure. The order in which some or all of the process operation blocks appear in process 800 should not be deemed limiting. Rather, one of ordinary skill in the art having the benefit of the present disclosure will understand that some of the process blocks may be executed in a variety of orders not illustrated, or even in parallel. The operations of process 800 may be performed by a particular system (e.g., ERDS 102) or may be distributed between various subsystems or modules in an ERDS, according to various embodiments.

At operation 802, process 800 receives, with a cloud server, audio data representative of a radio-based dispatch of first responders to a location of the initiated emergency communication, according to an embodiment.

At operation 804, process 800 provides the audio data to an AI-model, according to an embodiment.

At operation 806, process 800 prompts the AI-model to generate a summary of the radio-based dispatch from the audio data, according to an embodiment. In some implementations, an AI model, such as OpenAI Whisper speech recognition model or Deepgram speech to text model, is first used to transcribe audio data prior to providing the audio data to an AI model for summary generation. In some implementations, the summary generating AI model may be configured to either analyze the audio data directly or to internally transcribe, analyze, and summarize the audio data.

At operation 808, process 800 prompts the AI-model to extract a location of the initiated emergency communication, according to an embodiment.

At operation 810, process 800 provides the audio data to a first AI model, according to an embodiment.

At operation 812, process 800 searches, using the location of the initiated emergency communication, a database of premises for the operations center, according to an embodiment. The database of premises may be operable to associate premises addresses with corresponding ones of a plurality of operations centers. The operations center is one of the plurality of operations centers, according to an embodiment. In other words, the address extracted from the radio dispatch is mapped to the appropriate GSOC (or other operations center) to send the emergency notification to. These operations may be performed by determining if the coordinates of the mapped address intersect with a geospatial object belonging to that GSOC, which is an indication of a 911 call occurring from the same premises At operation 814, process 800 provides an AI-based emergency notification to an emergency response application that is operable to display the AI-based emergency notification on an operations center computing system of the operations center, according to an embodiment. The AI-based emergency notification includes at least one of the summary or the location of the initiated emergency communication, according to embodiments.

At operation 816, process 800 identifies overlapping names as ones of the plurality of names that are phonetically similar to ones of the plurality of street names, according to an embodiment.

At operation 818, process 800 provides the overlapping names to a second AI model, according to an embodiment.

At operation 820, process 800 prompts the second AI model to search the radio dispatch transcript for a location of the initiated emergency communication based on the overlapping names, according to an embodiment.

At operation 822, process 800 provides an AI-based emergency notification to an emergency response application that is operable to display the AI-based emergency notification on an operations center computing system, wherein the AI-based emergency notification includes the location of the initiated emergency communication, according to an embodiment.

Figure 9:
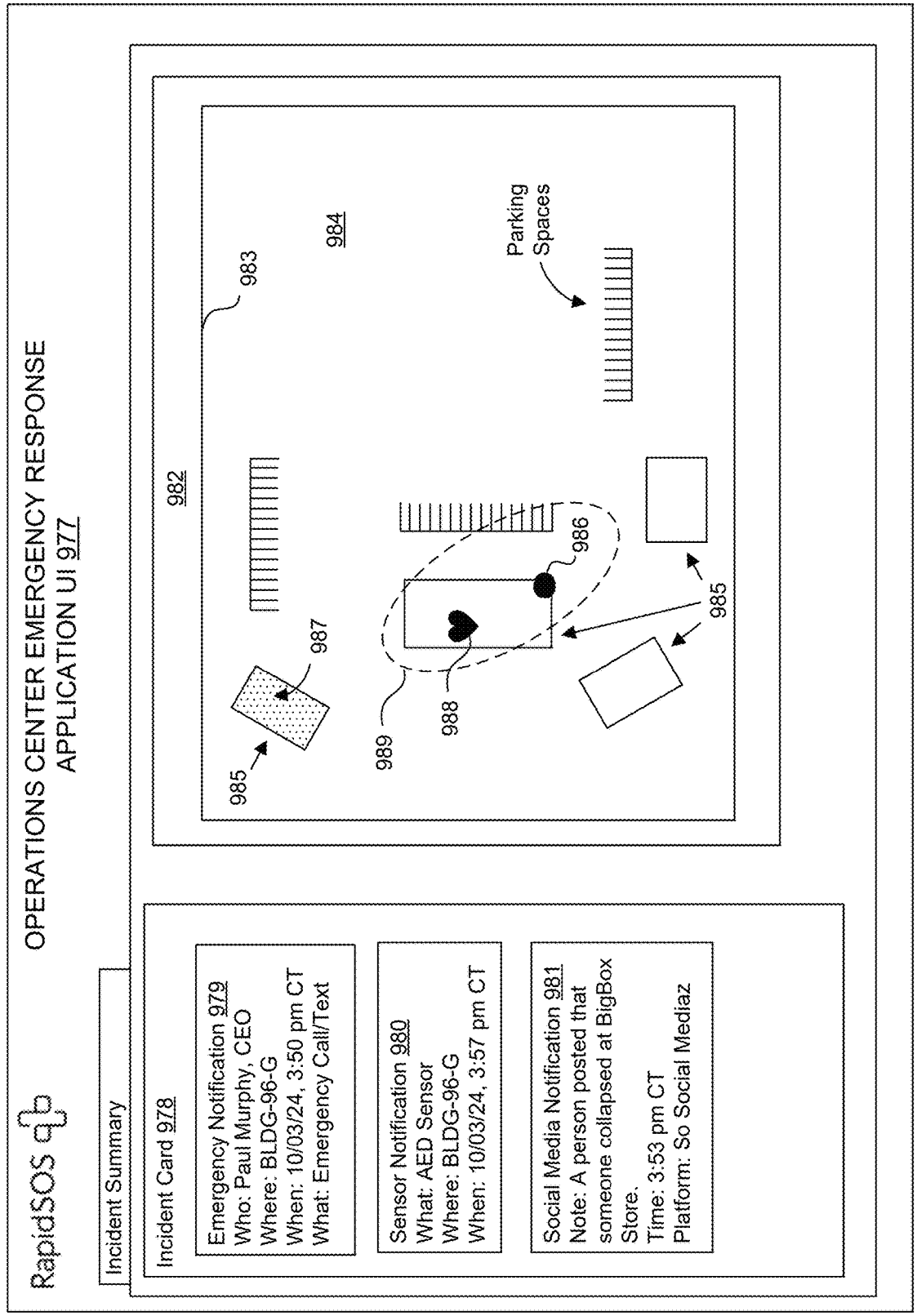
FIG. 9 illustrates a diagram of a user interface (UI) for an operations center emergency response application that is configured to manage emergencies, receive/display situational awareness services, receive/provide/display data exchange services, provide communications services, and/or display emergency response insights, in accordance with embodiments of the disclosure.

FIG. 9 illustrates a diagram of a UI 977 that is an example of a UI for an operations center emergency response application that is configured to manage emergencies, receive/display situational awareness services (e.g., from ERDS 102), receive/provide/display data exchange services, provide communications services, and/or display emergency response insights, in accordance with aspects of the disclosure. UI 977 includes an incident card 978 and a map 982, according to an embodiment. Incident card 978 and map 982 may be displayed to provide an incident summary, in response to a user selecting an incident summary tab or other UI element in an operations center emergency response application.

Incident card 978 may include an emergency notification 979, an alert notification 980, and a social media notification 981, according to an embodiment. Emergency notification 979 is an example of a situational awareness service and/or notification. Emergency notification 979 may provide a text-based notification or description of a particular premise (e.g., BLDG-96-G, an address, etc.) where an emergency call or textual message has been initiated. Location information, time of dispatch, date of dispatch, and/or type of dispatch may be generated using AI-based analysis of radio-based dispatches, in accordance with aspects of the disclosure.

Sensor notification 980 may provide an indication related to one or more sensors that have been used or otherwise triggered. For example, a defibrillator sensor may be configured to generate an alert or notification message when a defibrillator is removed from its case and/or actuated. Sensor notification 980 may include a time and location (e.g., within a premises managed by an operations center) where the particular sensor has been triggered, for example.

Social media notification 981 is configured to provide content of social media posts that are related to one or more additional emergency notifications, in accordance with aspects of the disclosure. Social media notification 981 may include a note that is a quote of a social media posts or that is a summary of a social media post. The summary of the social media post may be generated by one or more AI models and/or audio analysis modules, according to an embodiment. Social media notification 981 may also include a timestamp of the social media post and may provide a source (e.g., So Social Mediaz) of the social media post, according to various embodiments of the disclosure.

Map 982 illustrates examples of UI elements that support providing situational awareness details of an incident to an operations center operator, in accordance with aspects of the disclosure. Map 982 may include a premises boundary 983 that includes a parking lot 984, and a number of buildings or structures 985 to represent an example premises that is monitored or managed by an operations center, according to an embodiment. Parking lot 984 may include a number of parking spaces and regions for traffic ingress and egress. Buildings 985 represent one or more buildings having one or more floors that may be monitored and/or managed by an operations center, for example.

Situational awareness services and/or ERDS 102 may use map 982 to provide a visual notification (e.g., a region of interest, pinpoint, other indication of the location of an initiated emergency communication). Region of interest 986 represents a region of interest of an initiated emergency communication. Highlighting 987 (e.g., a speckle pattern) represents a highlighting an entire building or structure that can be used to indicate the location of an emergency, in accordance with aspects of the disclosure. Sensor icon 988 is an example of an icon that can be used to represent a type of sensor data (e.g., defibrillator) that is the source of sensor notification (e.g., sensor notification 980). An incident cluster 989 may be a visual and/or text-based indication (e.g., a broken line ellipse) that two or more notification sources may be related.

Figure 10:
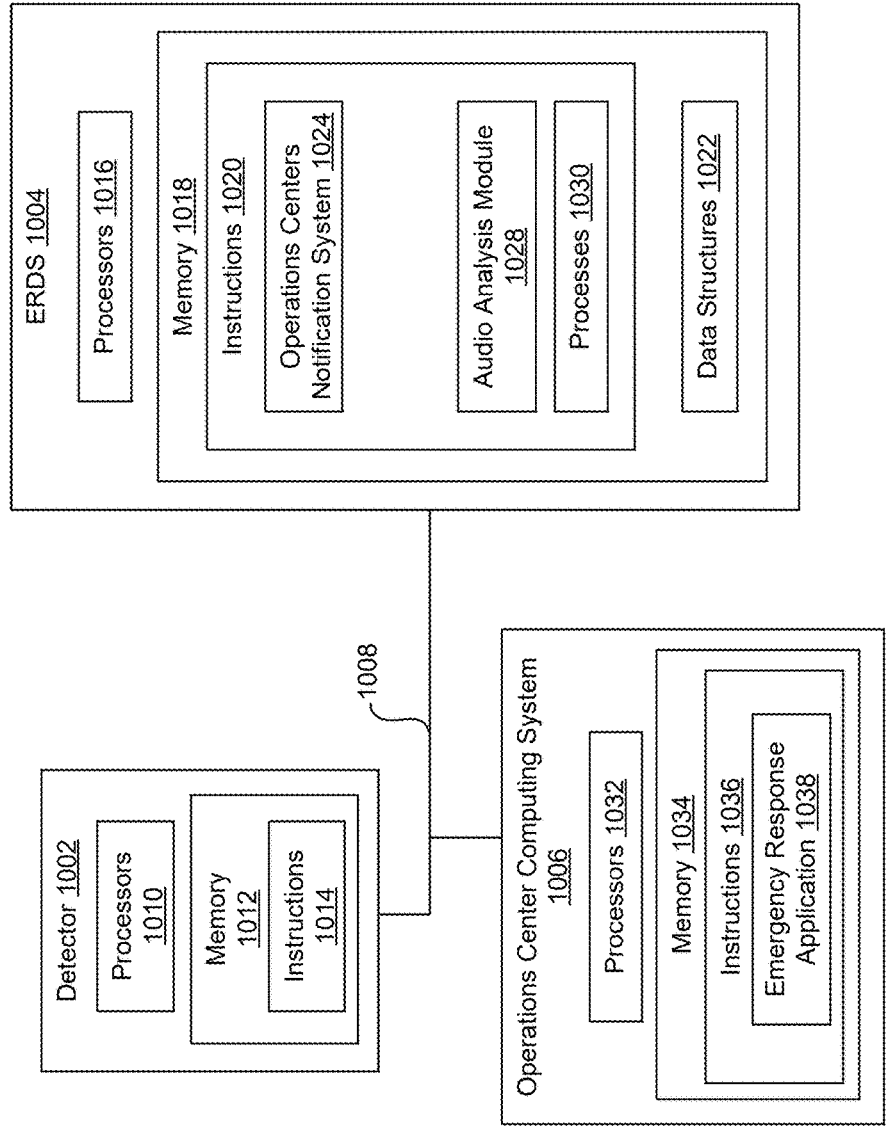
FIG. 10 illustrates an example diagram of an emergency response environment, in accordance with embodiments of the disclosure.

FIG. 10 illustrates an example diagram of an emergency response environment 1000, in accordance with aspects of the disclosure. Emergency response environment 1000 includes processing logic, (computer-readable) instructions, and data structures that may be employed by a detector 1002, an emergency management system (ERDS) 1004, and operations center computing system 1006, according to an embodiment. Detector 1002, ERDS 1004, and operations center computing system 1006 may be communicatively coupled to each other through one or more communication channels 1008 (e.g., networks, wired or wireless networks, Internet, intranet, etc.), according to an embodiment.

Detector 1002 is an example implementation of detector 170 (shown in FIG. 1), according to an embodiment. Detector 1002 may include one or more processors 1010 and memory 1012. Memory 1012 may include volatile and/or non-volatile memory. Memory 1012 may store instructions 1014 that may be executed by processors 1010, according to an embodiment.

ERDS 1004 may include processors 1016, memory 1018, and data structures 1022, according to an embodiment. Memory 1018 may include instructions 1020 and data structures 1022, according to an embodiment. Memory 1018 may include volatile and/or non-volatile memory. Instructions 1020 may be stored by memory 1018 and may include operations centers notification system 1024, an audio analysis module 1028, and one or more processes 1030, according to embodiments of the disclosure. Data structures 1022 may store one or more databases used within one or more of the disclosed emergency response environments and/or emergency response data systems, according to an embodiment.

Operations center computing system 1006 include processors 1032 and memory 1034, according to an embodiment. Memory 1034 may include instructions 1036, and instructions 1036 may include an emergency response application 1038. Emergency response application 1038 is representative of emergency response application 106 (shown in FIG. 1), according to an embodiment.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the widest scope consistent with this disclosure, the principles and the novel features disclosed herein.

The term "logic" and/or "processing logic" in this disclosure may include one or more processors, microprocessors, multi-core processors, application-specific integrated circuits (ASIC), and/or field programmable gate arrays (FPGAs) to execute operations disclosed herein. In some embodiments, memory may be integrated into the logic to store instructions to execute operations and/or store data. Logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An emergency response data system operable to provide artificial intelligence (AI)-based emergency notifications to operations centers, comprising:
   memory having instructions;
   one or more processors coupled to the memory and operable to execute the instructions to perform one or more operations, comprising:
      receive audio data representative of a radio-based dispatch of first responders to a location of an initiated emergency communication;
      provide the audio data to an AI model with a first prompt to transcribe the audio data into a radio dispatch transcript;
      extract, from the radio dispatch transcript, an identifier of an emergency communications center (ECC) that delivered the radio-based dispatch;
      search for a location of the ECC based on the identifier of the ECC;
      define a bias region as a pre-determined radius around the location of the ECC;
      provide the bias region to the AI model;
      provide the radio dispatch transcript to the AI model with a second prompt to analyze the radio dispatch transcript to extract a location of the initiated emergency communication from the radio dispatch transcript, wherein the second prompt includes prompt instructions for the AI model to extract the location of the initiated emergency communication at least partially based on the location of the initiated emergency communication being within or proximate to the bias region; and
      provide an AI-based emergency notification to an emergency response application that is operable to display the AI-based emergency notification on an operations center computing system, wherein the AI-based emergency notification includes the location of the initiated emergency communication.

2. The emergency response data system of claim 1, wherein the radio-based dispatch is transmitted over at least one of very-high frequency (VHF) or ultra-high frequency (UHF) radio waves.

3. The emergency response data system of claim 1, wherein the emergency response application is operable to display the AI-based emergency notification as a graphical point on a map that is displayed by the emergency response application.

4. The emergency response data system of claim 1, wherein the emergency response application is operable to display the AI-based emergency notification as a textual message including an address or description of the location of the initiated emergency communication.

5. The emergency response data system of claim 1, wherein the initiated emergency communication is a 911 call or a textual message to 911.

6. The emergency response data system of claim 1, wherein the operations center computing system is associated with an operations center, wherein the operations center manages one or more premises, wherein the one or more operations further comprise:
   determine that the location of the initiated emergency communication is located at a premises location of one of the one or more premises; and
   selectively provide the AI-based emergency notification to the emergency response application based on the location of the initiated emergency communication being located at a premises location of one of the one or more premises.

7. The emergency response data system of claim 1, wherein the one or more operations further comprise:
   provide the AI model with a third prompt to analyze the radio dispatch transcript to generate a summary of the radio dispatch transcript, wherein the AI-based emergency notification includes the summary of the radio dispatch transcript.

8. The emergency response data system of claim 1, wherein the one or more operations further comprise:
   provide the AI model with a third prompt to identify a type of emergency from the radio dispatch transcript, wherein the AI-based emergency notification includes the type of emergency described in the initiated emergency communication.

9. The emergency response data system of claim 8, wherein the type of emergency includes one of medical emergency, criminal emergency, fire emergency, traffic accident, or public safety threat.

10. The emergency response data system of claim 1, wherein the one or more operations further include:
    condition the audio data prior to transcription with removal of at least one of background noise, dispatch tones, or silence segments in the audio data.

11. The emergency response data system of claim 1, wherein the one or more operations further include:
    provide the bias region to a mapping service to request a plurality of street names within the bias region; and
    provide the plurality of street names to the AI model prior to providing the second prompt, wherein the second prompt includes prompt instructions for the AI model to extract the location of the initiated emergency communication at least partially based on the location of the initiated emergency communication including at least one of the plurality of street names.

12. The emergency response data system of claim 11, wherein the one or more operations further include:
    search the radio dispatch transcript for a plurality of names;
    define a list of potential addresses as ones of the plurality of names that match corresponding ones of the plurality of street names; and
    redefine the plurality of street names as being the list of potential addresses.

13. A method of notifying an operations center of an initiated emergency communication proximate to one of a plurality of premises associated with the operations center, comprising:
    receiving, with a cloud server, audio data representative of a radio-based dispatch of first responders to a location of the initiated emergency communication, wherein the initiated emergency communication includes a 911 call or a textual message to 911;
    defining a bias region based on a predetermined radius around an emergency agency, wherein the emergency agency includes an emergency services station that is an intended recipient of the radio-based dispatch or includes an emergency communications center (ECC) that provided the radio-based dispatch;
    providing the bias region to a mapping service;
    requesting, from the mapping service, a plurality of street names within the bias region;
    providing the audio data to a first artificial intelligence (AI) model;
    prompting the first AI model to transcribe the audio data into a radio dispatch transcript;
    searching the radio dispatch transcript for a plurality of names;
    identifying overlapping names as ones of the plurality of names that are phonetically similar to ones of the plurality of street names;
    providing the overlapping names to a second AI model;
    prompting the second AI model to search the radio dispatch transcript for a location of the initiated emergency communication based on the overlapping names; and
    providing an AI-based emergency notification to an emergency response application that is operable to display the AI-based emergency notification on an operations center computing system, wherein the AI-based emergency notification includes the location of the initiated emergency communication.

14. The method of claim 13, wherein requesting the plurality of street names includes using an application programming interface (API) for a mapping service provider to provide the bias region to the mapping service and to receive the plurality of street names from the mapping service.

15. The method of claim 13, further comprising:
    applying the plurality of street names and the plurality of names to one or more phonetic algorithms;
    identifying phonetic matches between the plurality of street names and the plurality of names; and
    defining the overlapping names as the phonetic matches.

16. The method of claim 13, further comprising:
    prompting the second AI model to generate a summary of the radio dispatch transcript; and
    including the summary in the AI-based emergency notification.

17. The method of claim 13, further comprising:
    defining a plurality of types of emergencies as including a medical emergency, a criminal emergency, a fire emergency, a traffic accident, and a public safety threat;
    prompting the second AI model to identify one of the plurality of types of emergencies described in the radio dispatch transcript; and
    including the one of the plurality of types of emergencies in the AI-based emergency notification.

18. The method of claim 13, further comprising:
    including at least part of the radio dispatch transcript in the AI-based emergency notification.

19. A method of notifying an operations center of an initiated emergency communication proximate to one of a plurality of premises associated with the operations center, comprising:
    receiving, with a cloud server, audio data representative of a radio-based dispatch of first responders to a location of the initiated emergency communication, wherein the initiated emergency communication includes a 911 call or a textual message to 911;
    providing the audio data to an AI-model;
    prompting the AI-model to generate a summary of the radio-based dispatch from the audio data;
    prompting the AI-model to extract a location of the initiated emergency communication;
    searching, using the location of the initiated emergency communication, a database of premises for the operations center, wherein the database of premises is operable to associate premises addresses with corresponding ones of a plurality of operations centers, wherein the operations center is one of the plurality of operations centers;
    prompting the AI model to identify an emergency agency associated with the initiated emergency communication;
    defining a bias region based on a predetermined radius around the emergency agency, wherein the emergency agency includes an emergency services station that is an intended recipient of the radio-based dispatch or includes an emergency communications center (ECC) that provided the radio-based dispatch responsive to the initiated emergency communication;
    providing the bias region to a mapping service;
    requesting, from the mapping service, a plurality of street names within the bias region;
    providing the plurality of street names to an artificial intelligence (AI) model;
    prompting the AI model to extract the location of the initiated emergency communication by phonetically matching the location to at least one of the plurality of street names; and
    providing an AI-based emergency notification to an emergency response application that is operable to display the AI-based emergency notification on an operations center computing system of the operations center, wherein the AI-based emergency notification includes at least one of the summary or the location of the initiated emergency communication.

20. The method of claim 19, further comprising:
    phonetically comparing, using a phonetic algorithm, words in the audio data with street names in a vicinity of the location of the initiated emergency communication, wherein the phonetic algorithm includes at least one of Soundex, Metaphone, or NYSIIS.

21. The method of claim 19, wherein the operations center is one of a global security operations center (GSOC), a railway network operations center (NOC), an emergency operations center (EOC), a traffic operations center (TOC), a utility operations center (UOC), a healthcare command center, an aviation operations center, or a maritime operations center.

* * * * *